United States Patent
Tellekamp, Jr. et al.

(10) Patent No.: US 12,087,948 B2
(45) Date of Patent: Sep. 10, 2024

(54) TERNARY NITRIDE NEGATIVE ELECTRODE BASED LITHIUM-ION BATTERY

(71) Applicants: Alliance for Sustainable Energy, LLC, Golden, CO (US); COLORADO SCHOOL OF MINES, Golden, CO (US)

(72) Inventors: Marshall Brooks Tellekamp, Jr., Denver, CO (US); Adele Clare Tamboli, Golden, CO (US); Chunmei Ban, Golden, CO (US); Celeste Louise Melamed, Golden, CO (US); Anna Osella, Rochester, MI (US)

(73) Assignees: Alliance for Sustainable Energy, LLC, Golden, CO (US); Colorado School of Mines, Golden, CO (US)

( * ) Notice: Subject to any disclaimer, the term of this patent is extended or adjusted under 35 U.S.C. 154(b) by 480 days.

(21) Appl. No.: 16/983,672

(22) Filed: Aug. 3, 2020

(65) Prior Publication Data
US 2021/0036322 A1 Feb. 4, 2021

Related U.S. Application Data

(60) Provisional application No. 62/881,638, filed on Aug. 1, 2019.

(51) Int. Cl.
*H01M 4/58* (2010.01)
*H01M 4/136* (2010.01)

(52) U.S. Cl.
CPC ............. *H01M 4/58* (2013.01); *H01M 4/136* (2013.01)

(58) Field of Classification Search
CPC .................. H01M 4/136; H01M 4/42
See application file for complete search history.

(56) References Cited

U.S. PATENT DOCUMENTS

2019/0051944 A1* 2/2019 Horibe ............. H01M 10/0585
2019/0088991 A1* 3/2019 Hegde ................ H01M 4/366

OTHER PUBLICATIONS

Alberi, K. et al., "The 2019 materials by design roadmap," IOP Journal of Physics D: Applied Physics, vol. 52, 2019, 48 pages.
Baggetto, L. et al., "Tin Nitride Thin Films as Negative Electrode Material for Lithium-Ion Solid-State Batteries," Journal of the Electrochemical Society, vol. 157, No. 3, 2010, 8 pages.
Balogun, M-S. et al., "Recent advances in metal nitrides as high-performance electrode materials for energy storage devices," Journal of Materials Chemistry A, vol. 3, 2015, 24 pages.
Cabana, J. et al., "Towards New Negative Electrode Materials for Li-Ion Batteries: Electrochemical Properties of LiNiN," Chem. Mater. vol. 20, 2008, 3 pages.
Fioretti, A. et al., "Combinatorial insights into doping control and transport properties of zinc tin nitride," Journal of Materials Chemistry C, vol. 3, 2015, 12 pages.
Lin, D. et al., "Reviving the lithium metal anode for high-energy batteries," Nature Nanotechnology, vol. 12, Mar. 2017, 13 pages.

(Continued)

*Primary Examiner* — Stephan J Essex
(74) *Attorney, Agent, or Firm* — Sam J. Barkley

(57) ABSTRACT

Disclosed herein are methods for making $Zn_{1-x}Sn_{1+x}N_2$.

6 Claims, 10 Drawing Sheets

(56) References Cited

OTHER PUBLICATIONS

Neudecker, B.J. et al., "Li-Ion Thin-Film Batteries with Tin and Indium Nitride and Subnitride Anodes MeNx(Me=Sn, In)," Electrochemical Society Proceedings, vol. 99-24, 10 pages.
Obrovac, M.N. et al., "Reversible Cycling of Crystalline Silicon Powder," Journal of the Electrochemical Society, vol. 154, No. 2, 2007, 6 pages.
Park, K.S. et al., "Characteristics of tin nitride thin-film negative electrode for thin-film microbattery," Elsevier Journal of Power Sources, vol. 103, 2001, 5 pages.
Pereira, N. et al., "The Electrochemistry of Zn3N2 and LiZnN A Lithium Reaction Mechanism for Metal Nitride Electrodes," Journal of the Electrochemical Society, vol. 149, No. 3, 2002, 10 pages.
Sun, Q. et al., "Cr1-xFexN ($0 \leq x \leq 1$) Ternary Transition-Metal Nitrides as Anode Materials for Lilthium-Ion Batteries," Electrochemical and Solid-State Letters, vol. 11, No. 12, 5 pages.
Wang, K. et al., "Electrochemical studies of ternary and quadruple lithium metal nitrides synthesized by ballmilling," Elsevier Solid State Ionics, vol. 160, 2003, 5 pages.
Yang, J. et al., "Ballmilling Synthesis and Electrochemical Characterization of Ternary Lithium Nitrides," Journal of the Electrochemical Society, vol. 150, No. 1, 2003, 3 pages.
Zhang, K. et al., "Mesoporous Cobalt Molybdenum Nitride: A Highly Active Bifunctional Electrocatalyst and Its Application in Lithium-O2 Batteries," Journal of Physical Chemistry C, vol. 117, 2013, 8 pages.
Zhu, Y. et al., "Strategies Based on Nitride Materials Chemistry to Stabilize Li Metal Anode," Advanced Science News, vol. 4, 2017, 11 pages.

\* cited by examiner

TERNARY NITRIDE NEGATIVE ELECTRODE BASED LITHIUM-ION BATTERY

CROSS REFERENCE TO RELATED APPLICATIONS

This application claims priority under 35 U.S.C. § 119 to U.S. provisional patent application No. 62/881,638 filed on 1 Aug. 2019, the contents of which are hereby incorporated in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

The rapid growth of global energy demand necessitates highly-efficient and dense energy storage. Despite shortcomings in lithium-ion battery (LIB) technology, the expanding electric vehicle (EV) market along with growing demand for long-lasting portable electronics has established LIBs as the primary energy storage device. Current LIBs use graphite anodes for cycle stability at the cost of energy density.

Current LIBs use graphite anodes for cycle stability at the cost of energy density. Current anode solutions are Li-metal (3860 mAh/g) and Si (3580 mAh/g), however these technologies result in the formation of dangerous Li dendrites (Li-metal) and detrimental volume expansion of almost 300% (Si). Uniform and pinhole-free coatings that are not reduced by Li are required to stabilize Li-metal against dendrite formation and unstable solid-electrolyte interfaces (SEI). An ideal coating is electrically insulating, ionically conducting, and robust against volumetric expansion/contraction, preventing reaction between Li and electrolyte while allowing Li-ions to pass through. Another solution is a next-generation high-capacity material which is either natively stable or natively forms a passivating SEI.

Growing energy storage demands on lithium-ion batteries necessitate significant materials improvements in all battery components, especially the low capacity graphite negative electrode. In this work, we explore tunable ternary $Zn_{1-x}Sn_{1+x}N_2$ thin films as high-capacity negative electrodes for LIBs. Enhanced performance is observed compared to previously published end-members zinc-nitride and tin-nitride, showing decreased irreversible loss and increased total capacity and cycle stability. The average (maximum) reversible capacity and 50-cycle capacity is 1270 mAh/g (1290 mAh/g) and 625 mAh/g (810 mAh/g), respectively, for Zn-rich films. Cation composition x is presented as a mechanism for tuning electrochemical properties, with Zn-rich films ($x=-0.18$) exhibiting superior reversible and 50-cycle capacities. Volume loss through dissolution or delamination is identified as the primary reversible capacity-loss mechanism.

SUMMARY

In an aspect, disclosed herein are methods to computationally identify and experimentally test ternary nitride materials as lithium absorbers for high-performance next-generation negative electrode materials.

In an aspect, disclosed herein is a battery comprising a ternary nitride-anode. In an embodiment, the anode lacks Li. In an embodiment, the battery comprises $Zn_{1-x}Sn_{1+x}N_2$. In an embodiment, the battery comprises $MgSiN_2$. In an embodiment, the battery comprises $MgTiN_2$. In an embodiment, the battery comprises $ZnSnN_2$. In an embodiment, the battery exhibits increased stability against Li reduction. In an embodiment, the battery exhibits less than about 1 V insertion potential for Li.

In an aspect, disclosed herein is a method of making a battery comprising a ternary nitride-anode. In an embodiment, the anode lacks Li. In an embodiment, the method further comprises a step that uses $Zn_{1-x}Sn_{1+x}N_2$. In an embodiment, the method further comprises a step that uses $MgSiN_2$. In an embodiment, the method comprises a step that uses $MgTiN_2$. In an embodiment, the method comprises a step that uses $ZnSnN_2$. In an embodiment, the battery made exhibits increased stability against Li reduction. In an embodiment, the battery made exhibits less than about 1 V insertion potential for Li.

Other objects, advantages, and novel features of the present invention will become apparent from the following detailed description of the invention when considered in conjunction with the accompanying drawings.

DETAILED DESCRIPTION

Figures 1A, 1B, 1C, 1D:
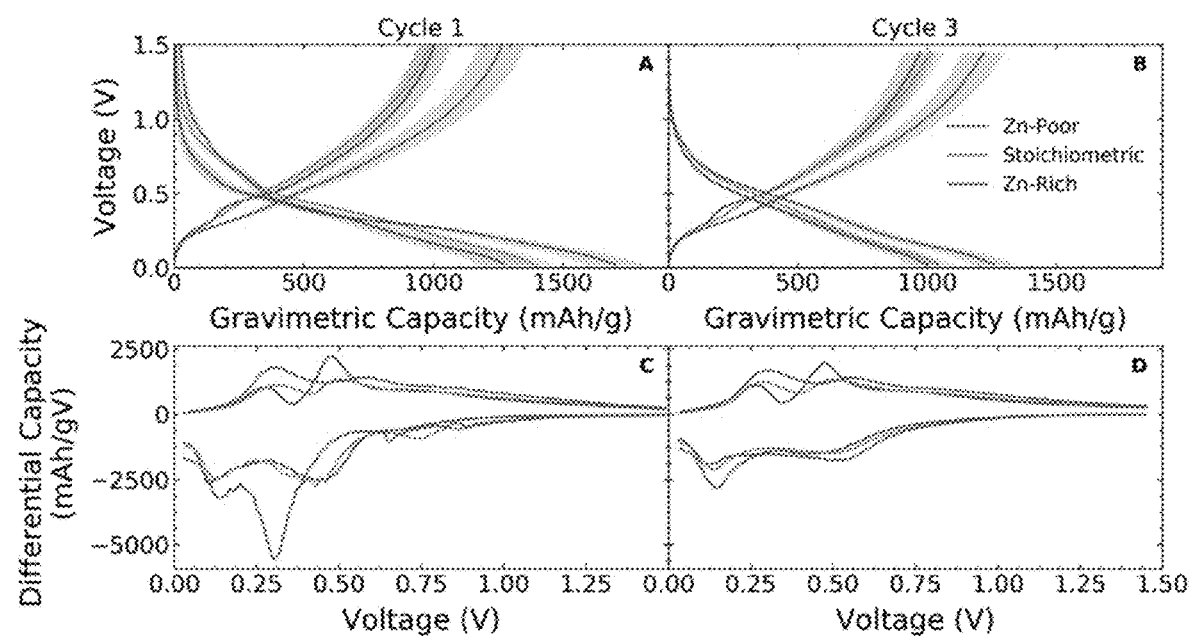
FIGS. 1a, 1b, 1c, and 1d depict a capacity curve and differential capacity for the first and third cycle for Zn-poor, stoichiometric, and Zn-rich electrodes.

Disclosed herein are methods to computationally identify and experimentally test ternary nitride materials as lithium absorbers for high-performance next-generation negative electrode materials.

The rapid growth of global energy demand necessitates highly efficient and dense energy storage. Despite shortcomings in lithium-ion battery (LIB) technology, the expanding electric vehicle (EV) market along with growing demand for long-lasting portable electronics has established LIBs as the primary energy storage device. ARPA-E forecasts that batteries need double the energy-density at one-third the cost of state-of-the-art LIBs to compete with gasoline-powered vehicles. Current LIBs use graphite anodes for superior cycle stability at the cost of energy density (372 mAh/g, 975 mAh/cm$^3$). Ideal and rigorously-researched anode solutions are Li-metal (3860 mAh/g, 2061 mAh/cm$^3$) and Si (3580 mAh/g, 8365 mAh/cm$^3$), however these technologies have failed to make an economic impact due to the formation of dangerous Li dendrites (Li-metal) and detrimental volume expansion of almost 300% (Si). Uniform and pinhole-free coatings that are not reduced by Li are required to stabilize Li-metal against dendrite formation and unstable solid-electrolyte interfaces (SEI). An ideal coating is electrically insulating, ionically conducting, and robust against volumetric expansion/contraction, preventing reaction between Li and electrolyte while allowing Li-ions to pass through. Another solution is a next-generation high-capacity material which is either natively stable against Li reduction or natively forms a passivating and ion-conducting SEI. Disclosed herein are ternary $ZnSnN_2$ as next-generation high capacity materials.

Nitrides are, in general, of interest to the LIB community because of the Li-ion conducting properties of the base compound $Li_3N$. The primary phase $\alpha$-$Li_3N$ forms in space group 191 (P6/mmm) consisting of edge-sharing hexagonal lithium in-plane centered on one nitrogen atom. Two additional lithium atoms are located above and below, creating a hexagonal bipyramid with 8-coordinate nitrogen. $Li_3N$ is natively Li deficient by about 1-2%, enabling an ultrafast intraplanar Li-ion hopping mechanism with an experimentally measured Li-ion conductivity of $10^{-3}$ $\Omega^{-1}$-cm$^{-1}$ at room temperature, the highest Li-ion conductivity value measured in a room temperature single crystal. Related structures possibly exhibiting similar conductivity values and partial conversion of the host material to $Li_3N$ are reasons often cited to pursue nitride negative electrodes. Nitrides generally show high gravimetric capacity, high thermal and chemical stability, and a low Li-insertion potential.

There are two general categories of nitrides studied as negative electrodes, lithiated transition-metal nitrides and single metal nitrides. Examples of studied lithiated transition-metal nitrides include $LiMoN_2$, $Li_7MnN_4$, and $Li_{3-x}M_xN$ where M is an element or combination of Co, Cu, Fe, and Ni. Binary nitrides studied as negative electrodes include those containing Co, Cr, Fe, Ge, Mn Mo, Ni, Sb, Sn, Ti, V, and Zn. Recent computational predictions suggest that binary nitrides and the corresponding lithium-containing ternaries are uniquely stable versus reduction by lithium when compared to oxides, sulfides, and fluorides of the same cation composition. Separate experimental work has shown that Li-ternary nitrides have superior cycle stability at similar gravimetric capacity when compared to either Li-binary nitride components; i.e. $Li_{3-x-y}Co_xCu_yN$ is more stable than $Li_{3-x}Co_xN$ or $Li_{3-x}Cu_xN$. A similar result is also demonstrated in the $Cr_xFe_{1-x}N$ system. $SnN_x$ and $Zn_3N_2$ have both shown promising initial capacity values of 925 mAh/g and 1325 mAh/g, respectively, although neither report discusses cycle stability beyond first capacity losses of 40% ($SnN_x$) and 55% ($Zn_3N_2$). For $Zn_3N_2$, x-ray diffraction (XRD) experiments confirm that Li$^+$ insertion occurs in multiple stages where the formation of $Li_xZn_y$ alloys in a matrix of $Li_3N$ through an initial conversion reaction is followed by the reversible transition between the $Li_xZn_y$—$Li_3N$ matrix and a LiZnN end-member along with free Li$^+$. The same reaction is theorized to occur for $SnN_x$. $ZnSnN_2$ belongs to a family of II-IV-N semiconductors related to the widely studied III-N materials by replacing two group III cations with one group II and one group IV, resulting in an orthorhombic supercell (space group Pna21). Low temperature deposited materials typically form cation-disordered wurtzite (space group P6$_3$mc) structures. $ZnSnN_2$ in particular has been the subject of recent optoelectronics research due to its optical bandgap (1 eV-2 eV), potential tunability, and defect tolerance. Cation composition x in $Zn_{1-x}Sn_{1+x}N_2$ has been previously shown to control conductivity, carrier density, carrier mobility, and optical absorption onset. Cation composition in $Zn_{1-x}Sn_{1+x}N_2$ has been experimentally varied by combinatorial sputtering from x=−0.5 to x=0.4, indicating a large tolerance for oxidation state shifts and therefore a hypothetical tolerance for substantial lithium insertion.

In the context of other successful ternary and higher nitride alloys this work explores $Zn_{1-x}Sn_{1+x}N_2$ as a negative electrode for lithium-ion insertion, reporting a maximum of 1710 mAh/g initial capacity for $Zn_{1.2}Sn_{0.8}N_2$ with a second cycle capacity of 1290 mAh/g (25% loss) and a 50-cycle capacity of 810 mAh/g (53% loss). Cation composition x in $Zn_{1-x}Sn_{1+x}N_2$ is used to modify electrochemical performance; Zn-rich films (x=−0.2) exhibit superior capacity, stoichiometric films (x=0) exhibit superior cycle stability, and Zn-poor (x=0.2) films exhibit the lowest irreversible capacity. All electrodes tested (Zn-poor, stoichiometric, and Zn-rich) have an initial capacity at 54 mA/g between approximately 1200 mAh/g and 1700 mAh/g, with reversible capacities of approximately 960 mAh/g to 1270 mAh/g.

TABLE 1

Various measured and calculated parameters for as-deposited $Zn_{1-x}Sn_{1+x}N_2$ films.

|  | Targeted x | Thickness (nm) | Zn % / (Zn % + Sn %) | Measured x | Conductivity (S-cm$^{-1}$) | Theoretical Density (g-cm$^{-3}$) |
|---|---|---|---|---|---|---|
| Zn-Poor | 0.2 | 320 ± 19 | 37.6 ± 0.31 | 0.25 ± 0.006 | 20.6 ± 2.2 | 6.835 ± .01 |
| Stoichiometric | 0 | 320 ± 11 | 47.8 ± 0.29 | 0.04 ± 0.006 | 13.0 ± 1.5 | 6.503 ± .01 |
| Zn-Rich | −0.2 | 245 ± 16 | 59.2 ± 0.25 | −0.18 ± 0005 | 11.0 ± 1.7 | 6.136 ± .008 |

$Zn_{1-x}Sn_{1+x}N_2$ electrodes were prepared on solvent-cleaned (acetone and isopropyl alcohol) copper foil substrates at room temperature by RF magnetron sputtering from zinc and tin targets in an argon atmosphere using an RF plasma source for reactive nitrogen. Films were deposited at three cation compositions targeting Zn-poor, stoichiometric, and Zn-rich films with a target thickness of approximately 250 nm. Control samples were grown on masked glass substrates and the thickness, shown in Table 1, was measured by profilometer to calculate total electrode volume. Composition was measured by x-ray fluorescence (XRF) as Zn percent of the total cation composition, assuming no vacancies or substitutions. The composition, conductivity, and theoretical density based on the measured composition are reported in Table 1. It should be noted that the theoretical density is based on a crystalline structure and likely represents an over-estimation, leading to actual gravimetric capacity values that are higher than reported. XRD measurements reveal primarily amorphous films with barely discernable polycrystalline wurtzite patterns on the same order as the noise floor. Electrochemical testing was performed using type coin cells versus a lithium-metal counter electrode, using 1.2 M $LiPF_6$ in 3:7 ethyl carbonate (EC): ethyl methyl carbonate (EMC) by weight as the electrolyte.

Cells were cycled at a rate of 55 mA/g from 1.5 V to 0.01 V, the first and third capacity cycle is shown both as-measured and differentiated in FIG. 1. The shaded error region shown represents one standard deviation in capacity averaged over multiple cells, taking into account the mean-squared error in measured cation composition and thickness (as shown in Table 1) which together determine the electrode weight. Error is omitted in the differential capacity plot for clarity. The initial discharge in FIG. 1a consists of three sloped plateaus, more easily visualized as peaks in the differential capacity plot in FIG. 1c, in ranges approximately 0.10 V-0.15 V, 0.30 V-0.45 V, and 0.65 V-0.80 V.

According to previous literature for $Zn_3N_2$ a plateau is observed at about 0.12V corresponding to the formation of Li—Zn alloys and at 0.8 V corresponding to the formation of a solid electrolyte interface (SEI). Detailed in situ XRD analysis in that work shows the formation of $LiZn_2$ and $Li_2Zn_3$ at 0.15 V and LiZn at 0.05 V. For $Sn_3N_4$ and SnN there are mixed and less detailed reports existing in the art reporting a reversible reaction around 0.2 V and an unnamed irreversible reaction around 0.9 V, while others report that an irreversible conversion reaction determined not to be SEI formation occurs at 0.7 V and another quasi-plateau around 0.2 V-0.3 V.

For $Zn_{1-x}Sn_{1+x}N_2$, the observed differential capacity peak (FIG. 1c) around 0.75 V is irreversible, either associated with the conversion reaction or the formation of an SEI, as is the large peak at 0.3 V visible primarily in the Zn-rich film. This peak primarily accounts for the initial capacity loss in the Zn-rich sample. For the Zn-poor and stoichiometric cases the initial

TABLE 2

Cycle statistic for $Zn_{1-x}Sn_{1+x}N_2$ electrodes versus lithium.

|  | Initial capacity | | Reversible capacity | | Initial capacity loss (%) | 50 cycle capacity (mAh/g) | 50 cycle capacity loss (%) |
|---|---|---|---|---|---|---|---|
|  | (mAh/g) | Li per formula unit | (mAh/g) | Li per formula unit |  |  |  |
| Zn-Poor | 1 290 ± 53 | 10.8 ± 0.45 | 1 010 ± 23 | 8.5 ± 0.19 | 22 ± 2.1 | 175 ± 39 | 86 ± 3.1 |
| Stoichiometric | 1 430 ± 41 | 11.5 ± 0.33 | 1 010 ± 22 | 8.1 ± 0.18 | 29 ± 2.9 | 575 ± 22 | 60 ± 1.9 |
| Zn-Rich | 1 720 ± 12 | 13.0 ± 0.09 | 1 270 ± 27 | 9.6 ± 0.21 | 26 ± 1.1 | 625 ± 134 | 64 ± 8.6 | capacity loss primarily comes from the peak around 0.45 V, with the same peak reversibly observable at smaller magnitude as shown in FIG. 1d. The reduction peak around 0.1 V-0.15 V is likely a summation of components from Li—Sn alloys and Li—Zn alloys, based on previous literature, with a visible shift towards greater voltage with increasing Zn content. The same trend is observed for all four reduction and oxidation peaks, shifting to higher voltage for higher Zn content and broadening the peaks. Qualitatively the Zn-poor case contains features observed in $Sn_3N_4$ and the Zn-rich case shows features observed in $Zn_3N_2$, indicating that $Li_xSn_yN_z$ and LiZnN are likely reversible end members for the conversion reaction as seen in previous literature. The reversible oxidation trend shows two clear peaks, one at 0.25 V-0.3 V, and a second at 0.45 V-0.55 V. The separation between these peaks/plateaus in the charge profile for the Zn-poor film clearly resembles the charge profile observed previously in $Sn_3N_4$ and SnN films, indicating that Zn-poor $ZnSnN_2$ tends towards tin nitride-like behavior as expected. Finally, the higher voltage redox couple around 0.45 V-0.55 V shows nearly zero overpotential on oxidation, indicating that in this cell geometry the reaction is occurring at maximum efficiency with no resistive losses.

Initial and reversible capacities for the $Zn_{1-x}Sn_{1+x}N_2$ electrodes are shown in Table 2. Capacity increases with increasing Zn content across all samples to higher values than would be expected based on theoretical density alone, i.e. capacity does not scale linearly with theoretical density. There are two immediately apparent explanations for this trend; either 1) film density is not linearly correlated with cation composition or 2) higher Zn content or $Zn_{Sn}$ anti-site defects are preferentially associated with higher capacity, either due to differing bond strength of Zn and Sn with nitrogen, Sn vacancies acting as host sites for Li, or an additional reaction with interstitial Zn. The correlation of Zn with increased capacity is corroborated by the $1^{st}$ cycle differential capacity curve in FIG. 1c, as well as the reversible capacity shown in Table 2. While the Zn-poor and stoichiometric cases have nearly identical reversible capacities (indicating lower initial capacity loss for the Zn-poor film), the Zn-rich film retains a similar fraction of its significantly larger initial capacity. Also of note are the initial capacity losses, which are much lower than that of either endpoint $Zn_3N_2$ (55%) or $Sn_3N_4$ (40%) while retaining similar or better reversible Li per cation insertion numbers (4-6 Li per Sn in $Sn_3N_4$ and SnN, 1.55 Li per Zn in $Zn_3N_2$).

Figure 2:
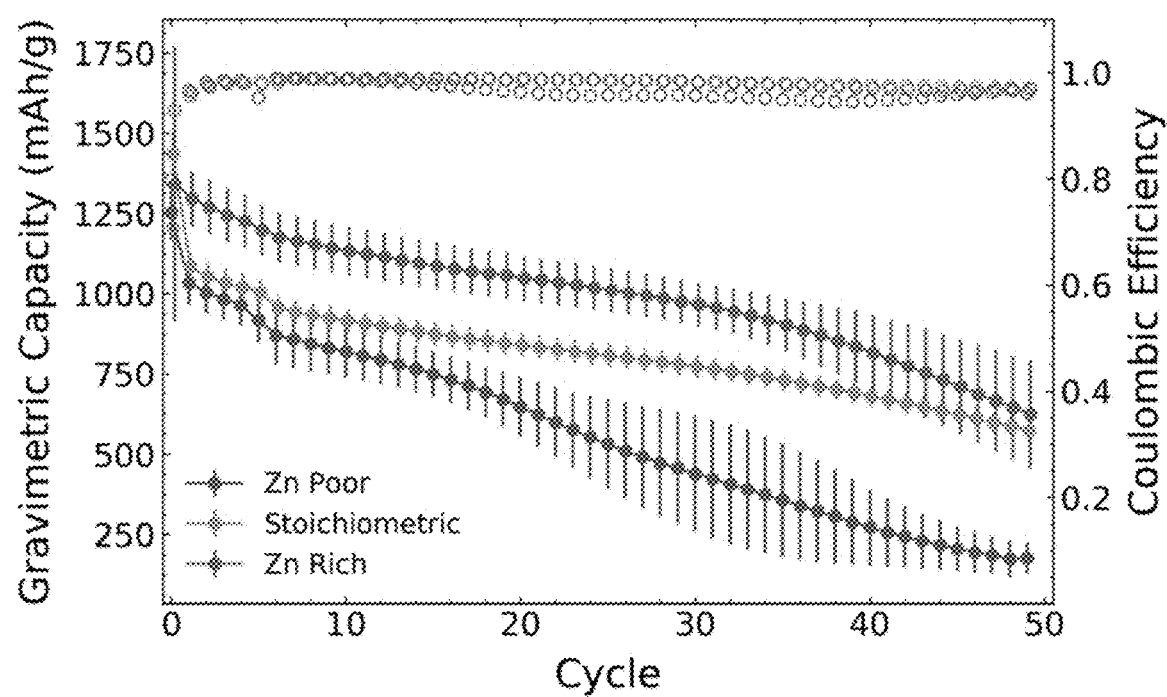
FIG. 2 depicts 50 cycle gravimetric capacity (closed circles with error bars) and coulombic efficiency (empty circles) for Zn-poor, stoichiometric, and Zn-rich $Zn_{1-x}Sn_{1+x}N_2$. All films had primarily delaminated from the copper substrate upon post-mortem investigation, indicating that the primary capacity loss mechanism is volume loss. Zn-poor electrodes started to degrade at an enhanced rate after 20-30 cycles, while Zn-rich electrodes show the same mechanism after 30-40 cycles. Observed statistical variation was much lower for the stoichiometric electrode. The first five cycles were conducted at 55 mA/g with subsequent cycles at 115 mA/g.
Figure 3:
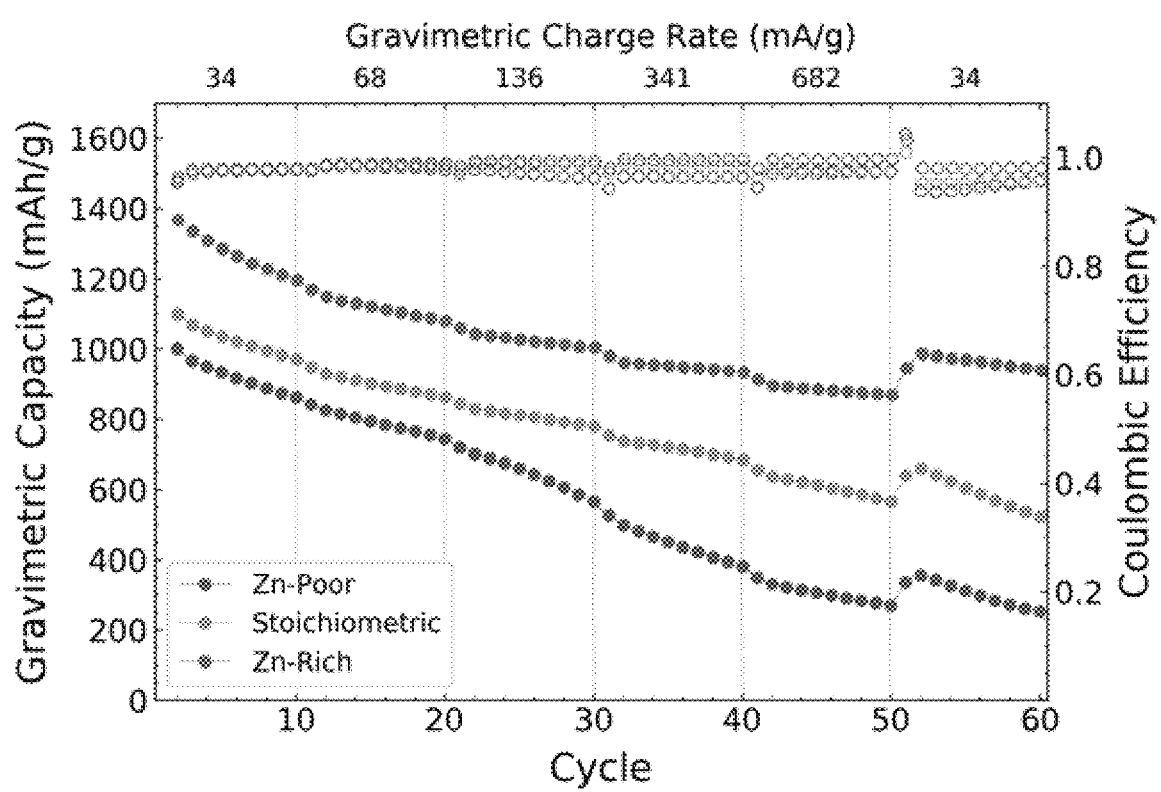
FIG. 3 depicts rate performance from 34 mA/g to 682 mA/g of Zn-poor, stoichiometric, and Zn-rich electrodes. Kinetically limited capacity steps are observed but minimal, likely due to the high electrical conductivity while implying sufficient ion conductivity. The curve is dominated by volumetric loss as demonstrated in FIG. 2. The closed circles represent gravimetric capacity, while the open circles represent coulombic efficiency.

Charge-rate dependent tests were performed on the $Zn_{1-x}Sn_{1+x}N_2$ half-cells to evaluate the rate performance of the electrodes. Cells were cycled for 10 cycles each at rates of 34 mA/g, 68 mA/g, 136 mA/g, 341 mA/g, and 682 mA/g, returning to the original rate of 34 mA/g for 10 final cycles, the results of which are shown in FIG. 3. The trend is overwhelmingly dominated by the volumetric loss as demonstrated in FIG. 2, and disassembled cells showed very little electrode material remaining on the Cu substrate. Even so, the Zn-rich film shows 870 mAh/g gravimetric capacity after 10 cycles at a moderately high rate of 682 mA/g, approximately C/2 assuming the first cycle capacity (1340 mAh/g) represents the full capacity. Capacity steps upon rate increase, an indication of kinetically limited charge transport, are small in this material system increasing as the charge rate increases. The small steps are an indication of fast carrier transport, both electrons and ions, and indicate favorable ion conductivity when considering the high electronic conductivity of $ZnSnN_2$ (see Table 1).

Figure 4:
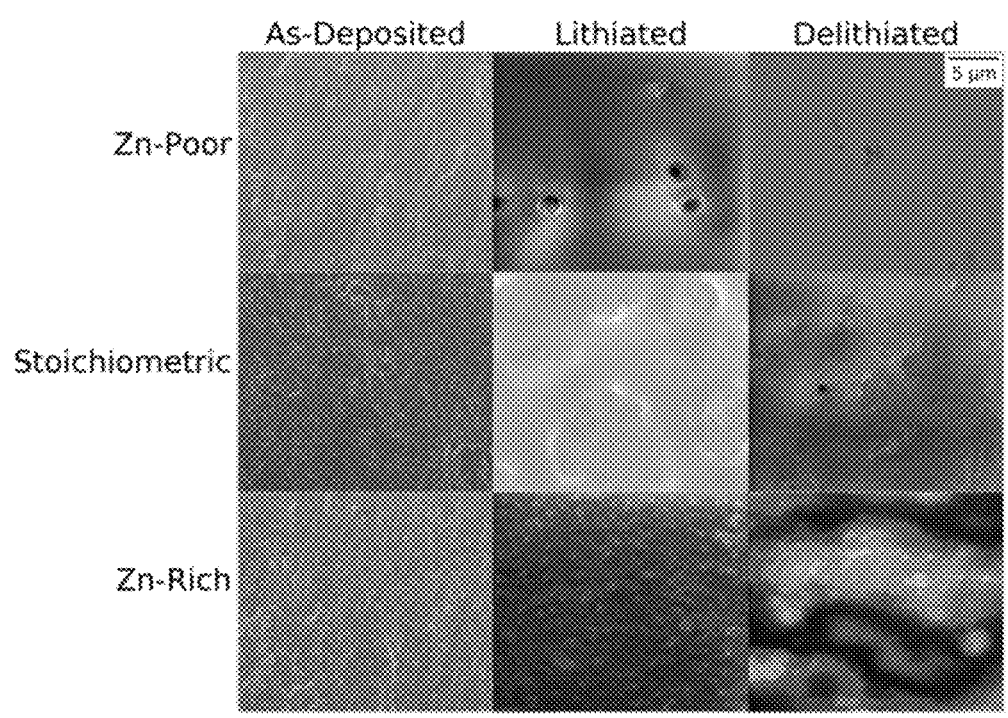
FIG. 4 depicts plan-view SEM micrographs of Zn-poor, stoichiometric, and Zn-rich $Zn_{1-x}Sn_{1+x}N_2$ as deposited, after one lithiation, and after one cycle. The charge/discharge rate was set at 55 mA/g. Native films are porous, expanding to close the pores after lithiation due to volumetric expansion. Surface aggregation and roughening are observed upon lithiation, with the formation of pits in the Zn-poor case. Cycled films retain reduced porosity compared to the native films, with increased surface features. Cracks were not observed after cycling.
Figure 5:
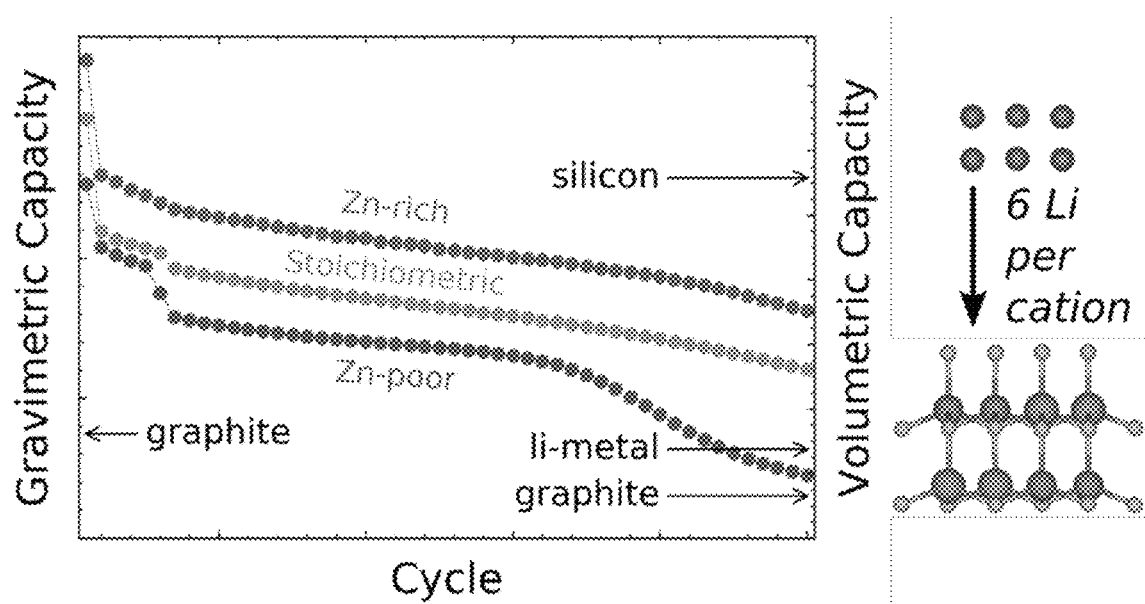
FIG. 5 depicts various aspects of an embodiment of the compositions disclosed herein.
Figure 6:
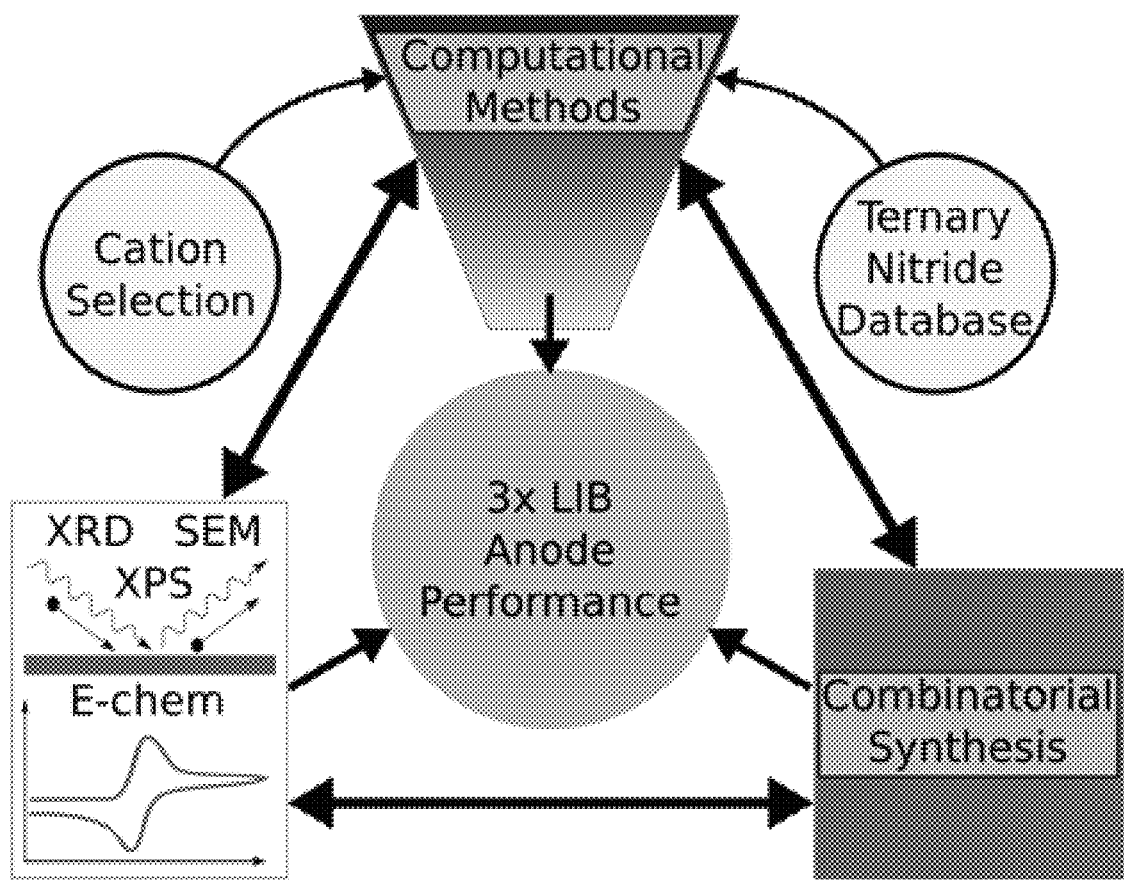
FIG. 6 depicts an embodiment of high-throughput screening of predicted ternary nitrides will determine candidates for deep-dive computation. Combinatorial synthesis and characterization material and half-cell properties will reveal new electrode materials and confirm/inform calculation accuracy.
Figure 7:
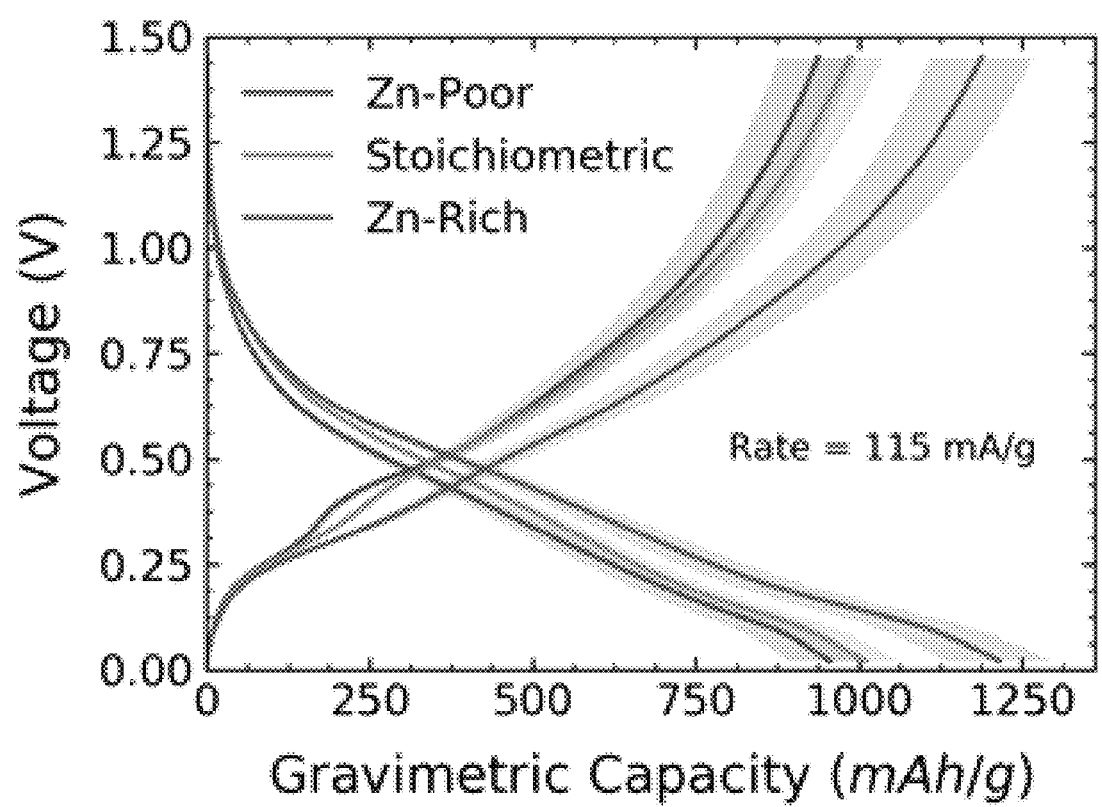
FIG. 7 depicts 5$^{th}$ cycle charge-discharge curves for $Zn_{0.8}Sn_{1.2}N_2$, $ZnSnN_2$, and $Zn_{1.2}Sn_{0.8}N_2$ with sample-to-sample error shown.
Figure 8:
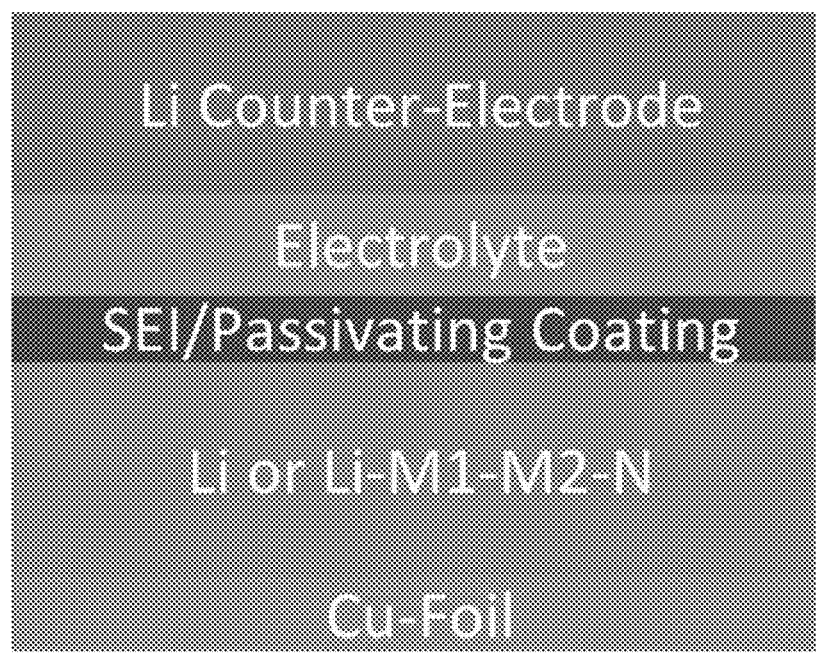
FIG. 8 depicts an embodiment of a half-cell battery structure with a passivated electrode or stable SEI.
Figure 9:
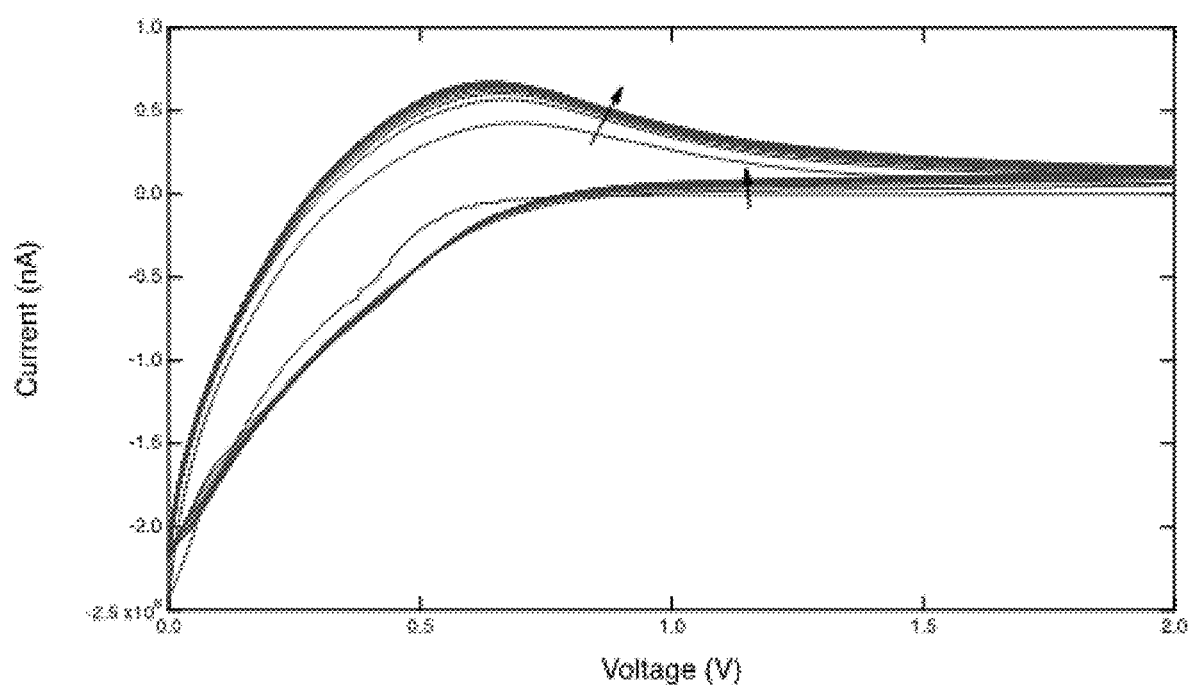
FIG. 9 depicts a ten-cycle current-voltage (CV) curve of $ZnSnN_2$ on Si.
Figure 10:
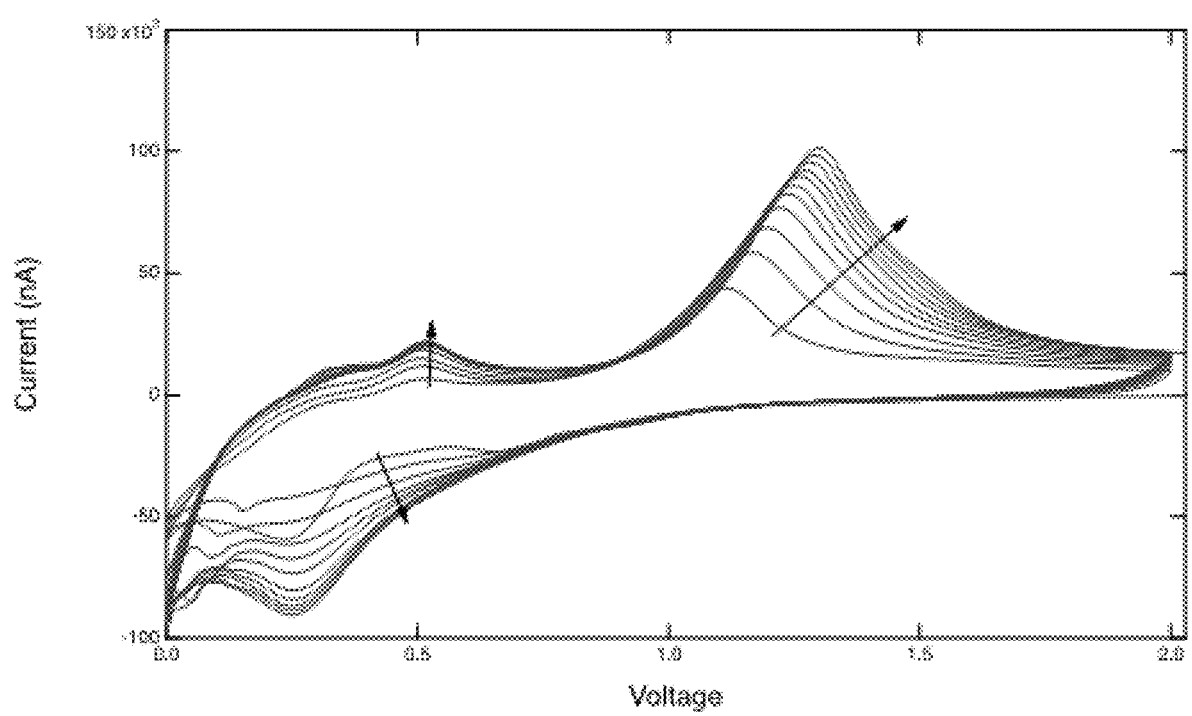
FIG. 10 depicts a ten cycle CV curve of $ZnSnN_2$ on vitreous carbon.

Scanning electron microscopy (SEM) was performed on samples as-deposited, after one lithiation, and after one full cycle (delithiated) to observe changes in microstructure and monitor the electrodes for signs of cracking due to volumetric expansion. Samples were loaded into the SEM chamber immediately after coin cell disassembly to minimize exposure to atmosphere, and observed at magnification ranges from 100× to 100,000×. Cracks were not observed at any magnification level. The micrographs at 10,000× magnification are shown in FIG. 4. The as-deposited films all appear similar, showing a porous microstructure with nanocrystalline grains (FIG. 4 left column). Upon lithiation the porous structure disappears due to the volumetric expansion associated with up-take of eight or more Li per formula. Pits are observed after lithiation in both Zn-poor and Zn-rich cases, with a much higher density of pits in the Zn-poor electrode. The lithiated stoichiometric and Zn-rich samples also show the formation of conglomerates on the surface, on the order of 5 μm for the stoichiometric film and 0.5 μm for the Zn-rich film. These conglomerates were not observed for the Zn-poor film. After delithiation the pore density in the Zn-poor and Zn-rich films is reduced, more drastically in the Zn-poor film, and pores appear in the stoichiometric film. From these images it appears that the primary mechanism for hosting the volumetric expansion and contraction lies the formation and dissolution of conglomerates on the surface, although further studies on the chemical makeup of these features are required to confirm this hypothesis.

In an embodiment, disclosed herein are computationally guided high-throughput materials synthesis and testing useful for the creation of new and improved batteries. In an embodiment, disclosed herein are methods for computational materials prediction and a powerful combinatorial materials synthesis and characterization suite, primarily geared towards nitride materials. High-throughput materials research is needed to improve all battery components using many material classes including nitrides, carbides, oxides, oxynitrides, and others. These materials advance both LIB's and beyond-LIB technologies such as Na, Mg, Zn, and Al.

Recent computational work has demonstrated that nitrides show superior electrochemical stability compared to sulfides, fluorides, or oxides with respect to reduction by lithium, identifying Li-M-N compounds with potential stability against Li-reduction. Separate experimental work has shown that Li-ternary nitrides have superior cycle stability at equal gravimetric capacity when compared to either Li-binary nitride components; i.e. $Li_{3-x-y}M1_xM2_yN$ is more stable than $Li_{3-x}M1_xN$ or $Li_{3-x}M2_xN$. Exploratory studies on the electrochemical behavior of sputtered $ZnSnN_2$ have revealed 1010 mAh/g (6565 mAh/cm$^3$) reversible capacity, a 3× improvement over graphite (gravimetric) and Li-metal (volumetric). This is also a significant improvement over the reported capacities of $Sn_3N_4$ (680 mAh/g) and $Zn_3N_2$ (550 mAh/g).

A computational ternary nitride database, calculating thermodynamic stability of M1-M2-N compounds with structures suggested using a Data-Mined Structure Predictor (DMSP). This theoretical approach, trained on ICSD data, successfully recovered known structures with an 80% success rate, and the subsequent calculations doubled the number of known thermodynamically stable nitrides from about 200 to about 400. Combinatorial nitride sputtering capabilities have experimentally synthesized and tested about ten of these new stable and metastable ternary nitrides. Each combinatorial sputtering deposition is able to probe 44 points in growth space across incident beam flux and temperature, using an entire suite of custom mapping characterization tools for analysis to allow rapid discovery of optimal deposition parameters for targeted materials. Disclosed herein are methods for computationally guided high-throughput battery materials research.

Cation tunability, where x≈±0.3 in $Zn_{1-x}Sn_{1+x}N_2$, allows additional optimization of material properties, a feature unique to ternary compounds. For example, tuning the Zn:Sn cation ratio results in up to 20% capacity increase, shown in FIG. 1. Despite these exciting initial results, the cycle stability shown in FIG. 1 displays volume loss from delamination. Without being bound by theory, this is not a surprising result; reversibly exchanging 8-10 Li per formula unit should result in significant strain the devices were not engineered to withstand. It is expected that through a computationally guided (rather than semi-random) selection of cations and their resulting structures, we will discover negative electrode materials exhibiting greater stability at similarly high capacity values. Computation on the thermodynamically stable compounds already predicted by the ternary nitride database will provide a guided understanding of electrochemical stability vs. Li and electrical conductivity, allowing computational screening for candidate electrode materials and coatings that will significantly enhance the capacity and efficiency, and reduce overall cost, of lithium-ion batteries.

In an embodiment, materials are proposed based on cathodic limit vs Li (stability against reduction), atomic weight, earth-abundance, density, non-toxicity, and published stability calculations. In an embodiment, about 100 stoichiometries comprising 30-50 cation combinations for computational refinement are targeted. In a prophetic embodiment, an initial breadth-first set of calculations will determine ground states and crystal structures of ternary nitrides composed of these selected cations. Once the ground state is determined, the products will be down-selected based on desirable properties and structures for deep-dive computation. Meanwhile experimental tests $MgSiN_2$ and $MgTiN_2$, materials initially selected for their low atomic weight, theoretical stability against Li reduction. This approach, along with a continued investigation $ZnSnN_2$, will significantly minimize ramp-up time and provide an understanding of the Li-capture mechanism and resulting structural modifications related to nitride electrochemistry.

In another prophetic example, the optimized ternary nitrides conceived of herein will be deposited on Cu or stainless steel foil (stable vs. Li) and fabricated into coin cells using a Li counter-electrode and 1.2M $LiPF_6$ in 3:7 EC:EMC as the electrolyte. These cells will be tested for capacity and cycle stability, then analyzed in operando and post-mortem by microscopy and various chemical and structural analysis techniques to understand the underlying physical processes. Electrochemical impedance spectroscopy (EIS) and cyclic voltammetry (CV) will be used to understand the underlying physics, electrochemical reactions, and SEI when coupled with the above characterization techniques, and x-ray diffraction (XRD) will be used to identify structural modifications. Results from initial materials, including the ongoing $ZnSnN_2$ results shown here, will be used to identify key parameters associated with cycle stability to feed back into the computational model to improve predictive capabilities, computationally identify, through deep-dive thermodynamic calculations, at least five ternary nitrides with properties beneficial for LIB electrode implementation including (but not limited to) a wide cathodic window representing stability against Li-reduction, a low voltage (<1 V) insertion potential for Li, a strain-tolerant crystal structures and/or structures with Li-host sites, minimized density and atomic weight, and earth abundant/low cost elements; and to identify optimized growth parameters for at least one material using the combinatorial sputtering and characterization techniques; and to experimentally demonstrate the electrochemical, structural, and morphological characteristics of this material through in-operando and post-mortem testing; and to identify key parameters for model optimization; and to characterize capacity and cycle stability as a function of tunable cation composition In an embodiment, using methods and compositions disclosed herein, it is conceived that new electrodes, electrolytes, additives, and coatings for optimized battery technologies not only in the Li system but also Na, Mg, Zn, etc. will be discovered. Prophetic examples include computationally predicted electrodes in other anion families such as oxynitrides, fluorides, and carbides, computationally predicted solid state electrolytes for all-solid-state batteries, and computationally optimized electrode-electrolyte chemistries.

In a prophetic example, synthesis of initial-condition materials, $MgTiN_2$ as a conductor and $MgSiN_2$ as an insulator, and computational predictions are contemplated using methods and materials disclosed herein. In a prophetic example, additional experiments on $ZnSnN_2$ will be measured by the identification and characterization of a new negative electrode material as described herein, with capacity at least 3x greater than current graphite anodes.

In a prophetic embodiment, electrochemical characterizations of non-Li-containing ternary nitrides are disclosed herein. Nitrides exhibit superior electrochemical stability compared to sulfides, fluorides, or oxides with respect to reduction by lithium, identifying Li-M-N compounds with potential stability against Li-reduction. Disclosed herein are methods for the identification and characterization of new negative electrode materials with capacity at least 3x greater than current graphite anodes. These new materials and methods include the identification and incorporation of at least five ternary nitrides with properties beneficial for LIB electrode implementation including a wide cathodic window representing stability against Li-reduction, a low voltage insertion potential for Li, a strain-tolerant crystal structures and/or structures with Li-host sites, minimized density and atomic weight, and earth abundant/low cost elements.

Computationally identified ternary nitrites with properties beneficial for use in LIBs.

In an embodiment, disclosed herein are methods for making ternary nitrides includes the steps of synthesis of initial condition materials $MgTiN_2$ and $MgSiN_2$; identification of target material ground-state structures calculated from ternary nitride database compounds which are then selected for further computational analysis. Next, synthesis and structural, chemical, and electrical characterization of candidate materials occurs. Additional electrochemical testing (coin-cells) and characterization (in operando and post-mortem) of synthesized materials then occurs.

In an embodiment, $ZnSnN_2$ electrodes are made by synthesizing $MgTiN_2$ and/or $MgSiN_2$ by combinatorial sputtering. The $MgTiN_2$ and/or $MgSiN_2$ are then tested electrochemically. For ternary nitrides of selected cations, the first ground state and crystal structure are identified. The next step is the selection of target materials for further computational analyses. In an embodiment, synthesis of at least one of the identified materials occurs by using combinatorial sputtering. Further electrochemical testing of the synthesized materials then occurs and may include in operando analysis of the synthesized material.

Lithium Absorbing $Zn-IV-N_2$ Materials $ZnSnN_2$ and $ZnGeN_2$ can be deposited on to nearly any substrate by RF sputter deposition over a large range of temperatures (room temperature to 800° C.) and cation stoichiometry ratios (II:IV ratio from about 30%-70%, depending on the deposition conditions and elements used). Additionally, the group IV cation (Sn, Ge) may be alloyed to modify the lattice constant from 3.19 Å to 3.38 Å.

Zn-IV-nitrides will be sputter deposited onto conductive substrates (Si at first), fabricated into coin cells, and cycled to attempt anode lithium insertion. XRD will compare the native material to the electrochemically cycled material for structural changes. It is hypothesized that lithium will form a $Li_3N$ matrix within the $Zn-IV-N_2$ anode isolating metallic Zn and (Sn, Ge) for reaction with lithium as has been previously shown for $Zn_3N_2$, $Sn_3N_4$, and $Ge_3N_4$. Due to the relative simplicity of fabricating the anodes $ZnSnN_2$ and $ZnGeN_2$ will both be tested. Results from the initial XRD scans will determine the next testing steps which could include adjusting the anode stoichiometry, microscopy analysis, and spectroscopy analysis.

Without being limited by theory, upon the initial cycle a significant portion of Li capacity will be lost to the formation of a $Li_3N$ matrix within the anode. Subsequent lithium cycling may then occur through an alloying process with the cation products of the $Li_3N$ formation reaction. In an embodiment, the amount of lithium inserted into the unit cell may be multiple lithiums per cation which may be reversibly supported. In another embodiment, results from initial materials are expected to improve model efficacy through key parameter identification, and additional opportunities are expected by adapting the same technology developed here to oxynitrides, carbides, and other anions, as well as other battery elements such as cathodes and electrolytes. High-throughput computationally predicted battery materials will also open up other opportunities for high-throughput screening of electrolytes, additives, coatings, and positive electrodes.

The foregoing disclosure has been set forth merely to illustrate the invention and is not intended to be limiting.

We claim:

1. A battery comprising a ternary nitride-anode that lacks Li wherein the battery further comprises $Zn_{1-x}Sn_{1+x}N_2$ wherein x does not equal zero.

2. The battery of claim 1 exhibiting increased stability against Li reduction in comparison to a battery of the same composition but lacking a ternary nitride-anode.

3. The battery of claim 1 exhibiting less than about 1 V insertion potential for Li.

4. A battery comprising a ternary nitride-anode that lacks Li wherein the battery further comprises $ZnSnN_2$.

5. The battery of claim 4 exhibiting increased stability against Li reduction in comparison to a battery of the same composition but lacking a ternary nitride-anode.

6. The battery of claim 4 exhibiting less than about 1 V insertion potential for Li.

* * * * *